US011132674B2

(12) United States Patent
Tan

(10) Patent No.: US 11,132,674 B2
(45) Date of Patent: Sep. 28, 2021

(54) MICRO TRUSTED NETWORK

(71) Applicant: Sizhe Tan, Berkeley, CA (US)

(72) Inventor: Sizhe Tan, Berkeley, CA (US)

(*) Notice: Subject to any disclaimer, the term of this patent is extended or adjusted under 35 U.S.C. 154(b) by 738 days.

(21) Appl. No.: 14/998,898

(22) Filed: Mar. 1, 2016

(65) Prior Publication Data
US 2016/0260093 A1  Sep. 8, 2016

Related U.S. Application Data

(60) Provisional application No. 62/177,063, filed on Mar. 4, 2015.

(51) Int. Cl.
| | |
|---|---|
| *G06Q 20/38* | (2012.01) |
| *G06Q 20/06* | (2012.01) |
| *G06Q 20/24* | (2012.01) |
| *G06Q 20/34* | (2012.01) |
| *H04L 9/32* | (2006.01) |
| *G09C 5/00* | (2006.01) |
| *H04L 9/30* | (2006.01) |

(52) U.S. Cl.
CPC ....... *G06Q 20/3829* (2013.01); *G06Q 20/065* (2013.01); *G06Q 20/24* (2013.01); *G06Q 20/34* (2013.01); *G09C 5/00* (2013.01); *H04L 9/302* (2013.01); *H04L 9/3226* (2013.01); *H04L 9/3271* (2013.01); *G06Q 2220/00* (2013.01); *H04L 2209/56* (2013.01); *H04L 2209/805* (2013.01)

(58) Field of Classification Search
None
See application file for complete search history.

(56) References Cited

U.S. PATENT DOCUMENTS

| | | | | |
|---|---|---|---|---|
| 6,028,937 A | * | 2/2000 | Tatebayashi | ....... G06Q 20/3674 380/201 |
| 6,031,914 A | * | 2/2000 | Tewfik | .................. G06T 1/0028 341/4 |
| 6,047,374 A | * | 4/2000 | Barton | .................. G06T 1/0028 348/E7.056 |
| 6,327,578 B1 | * | 12/2001 | Linehan | ................. G06Q 20/02 705/65 |
| 7,184,988 B1 | | 2/2007 | Frankel et al. | |
| 8,442,221 B2 | | 5/2013 | Ming | |
| (Continued) | | | | |

*Primary Examiner* — Patrick Mcatee
*Assistant Examiner* — Jason B Fenstermacher
(74) *Attorney, Agent, or Firm* — Suganda Jutamulia

(57) ABSTRACT

An embedded picture can be embedded with secret embedded payloads. A method is disclosed for performing trusted binding between a first participant and a second participant based on RSA cryptosystem using the embedded picture having a first area assigned to the first participant for a first secret embedded payload, and a second area assigned to the second participant for a second secret embedded payload. Multiple payloads may be embedded in the embedded picture by multiple participants. Each payload can only be encrypted and decrypted by its corresponding participant. Multiple participants may form a trusted network, in the network each participant can be recognized and validated digitally. Accordingly, various activities such as transaction of digital credit card, verification of digital identification (ID) card, transaction of digital currency note may be performed using the trusted network.

15 Claims, 15 Drawing Sheets

(56) References Cited

U.S. PATENT DOCUMENTS

| | | |
|---|---|---|
| 8,560,857 B2 | 10/2013 | Munetoh et al. |
| 2006/0251290 A1* | 11/2006 | TeSelle ................ G06F 17/211 |
| | | 382/100 |
| 2009/0187764 A1* | 7/2009 | Astakhov .............. H04L 9/3263 |
| | | 713/170 |
| 2011/0154025 A1* | 6/2011 | Spalka ................. H04L 9/3236 |
| | | 713/156 |
| 2013/0179690 A1 | 7/2013 | Wu |
| 2013/0262314 A1 | 10/2013 | Butler et al. |
| 2013/0283061 A1 | 10/2013 | Jeong |
| 2018/0349895 A1* | 12/2018 | Ericson .............. G06Q 20/3829 |

\* cited by examiner

MICRO TRUSTED NETWORK

CROSS-REFERENCE TO RELATED APPLICATIONS

This application claims the benefit to U.S. Provisional Application No. 62/177,063, filed Mar. 4, 2015.

FIELD OF THE INVENTION

This invention relates to a micro trusted network that may perform transaction of digital credit card, verification of digital ID card, transaction of digital currency note, and the like.

BACKGROUND OF THE INVENTION

Encryption processes such as AES (Advanced Encryption Standard) encryption and RSA (Rivest Shamir Adleman) encryption and the like are widely known and commonly used for protecting a secret in transmission. A secret may be for privacy and the like. Since the message transmitted is encrypted, an unauthorized receiver may not be able to read it. However, although a receiver may not be able to decrypt the message received, the receiver knows that the message is encrypted, since the encrypted message is typically randomized and not human recognizable.

In some instances, an encrypted message may attract unwanted attention and more likely to get blocked or dropped in the transmission. Accordingly, not only an encrypted message is desired, but an encrypted message carried by a disguised media such as a human recognizable picture or document is also desired. So, the message transmitted looks like an unrelated but human recognizable picture or document, but actually a secret payload is encoded or embedded in the human recognizable image. In other words, a secret payload may be embedded in an embedded picture.

Furthermore, multiple payloads may be embedded in an embedded picture by multiple participants. Each payload can only be encrypted and decrypted by its corresponding participant. In other words, different payloads are secrets of different participants, respectively.

Based on this property, multiple participants may form a trusted network, in the network each participant can be recognized and validated digitally. Accordingly, various activities such as transaction of digital credit card, verification of digital identification (ID) card, transaction of digital currency note may be performed using the trusted network.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
FIG. 1A shows an exemplary embedded picture already embedded with a payload.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, method or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, methods or characteristics may be combined in any suitable combinations and/or sub-combinations in one or more embodiments.

Figure 1B:
FIG. 1B shows an exemplary payload embedded in the embedded picture.

FIGS. 1A and 1B show the payload-in-picture encoding disclosed in U.S. patent application Ser. No. 14/544,679 filed on Feb. 2, 2015 by the current applicant, which is incorporated by reference herewith.

FIG. 1A is an exemplary picture already embedded with a payload, for simplicity, the picture in FIG. 1A is referred as an embedded picture 102. For example, embedded picture 102 is an image of flower as shown in FIG. 1A. FIG. 1B is an exemplary payload embedded in embedded picture 102. For simplicity, the payload embedded in embedded picture 102 is referred as an embedded payload 104. For example, embedded payload 104 is an image of panda as shown in FIG. 1B. As explained in detail in U.S. patent application Ser. No. 14/544,679, using a secret key, embedded payload 104 of FIG. 1B can be retrieved from embedded picture 102 of FIG. 1A. U.S. patent application Ser. No. 14/544,679 also teaches methods for embedding embedded payload 104 in embedded picture 102.

Figure 2A:
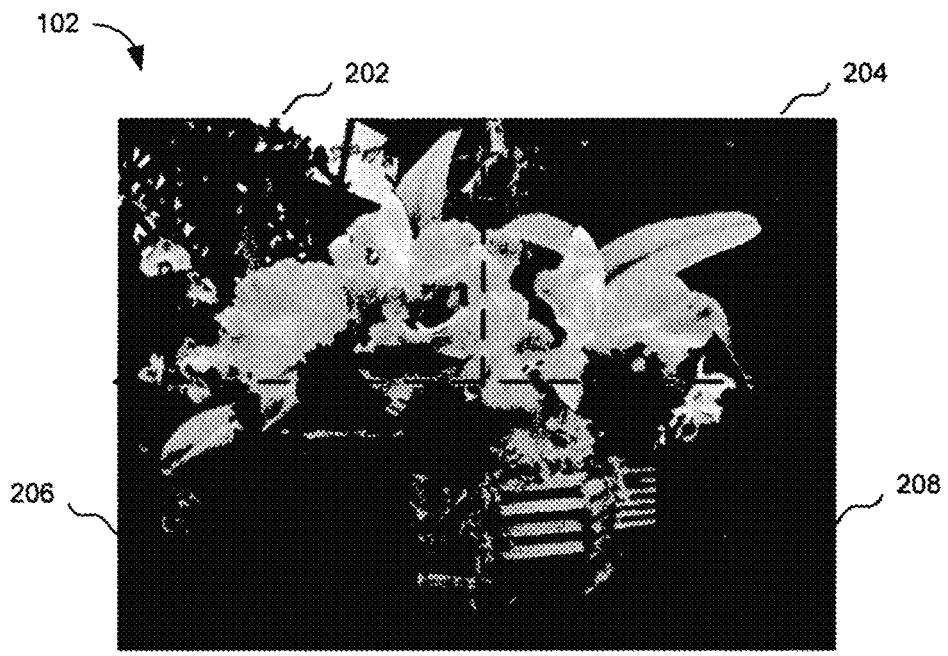
FIG. 2A shows the embedded picture partitioned into a plurality of areas.

FIG. 2A shows that embedded picture 102 is partitioned into a plurality of areas, for example, 202, 204, 206, 208, according to the teaching of the present invention. It is appreciated that embedded picture 102 may be partitioned into n areas, where n is larger than unity. Each partitioned area is assigned to a specific participant in a micro trusted network, according to the teaching of the present invention. Since the number of participants in the network may be small, the network is referred as micro trusted network. However, it is possible that the network includes a large number of participants.

Figure 2B:
FIG. 2B shows the embedded picture partitioned into two areas.

For example, the micro trusted network may include two participants, participant A and participant B. Accordingly, embedded picture 102 is also partitioned into two areas, a first area 210 and a second area 212 as shown in FIG. 2B, according to the teaching of the present invention. First area 210 may be the upper half of embedded picture 102, and second area 212 may be the lower half of embedded picture 102. For example, first area 210 is assigned to a first participant A, and second area 212 is assigned to a second participant B. The micro trusted network having two participants A and B is formed through the embedded picture having two areas assigned to participants A and B, respectively.

Figure 2C:
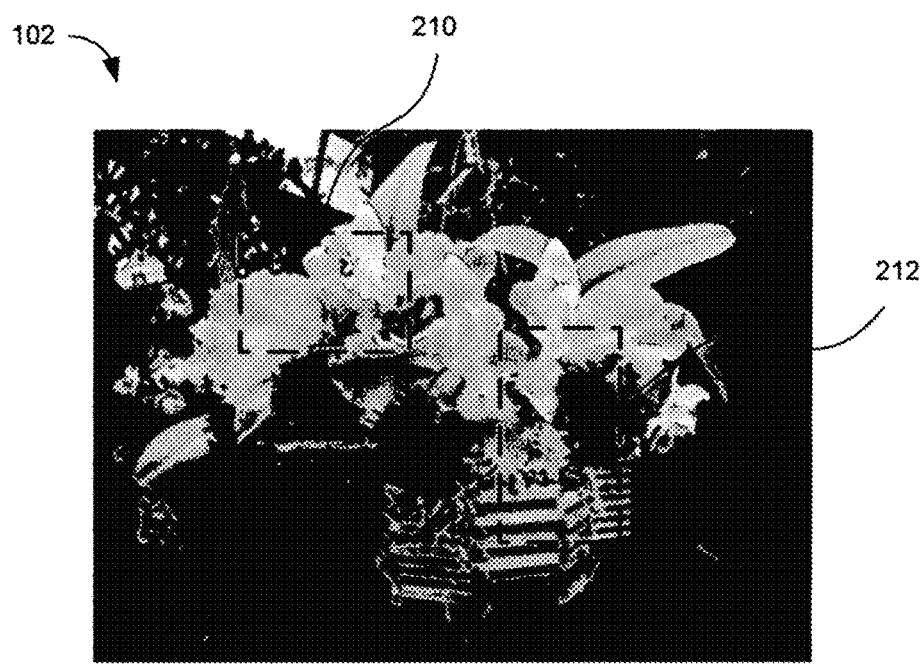
FIG. 2C shows the embedded picture having areas arbitrarily shaped and located.

In another embodiment, first area 210 may not be a half of embedded picture 102, and second area 212 may not be another half of embedded picture 102. First area 210 and second area 212 may have arbitrary shapes and may be located arbitrarily in embedded picture 102, and do not overlap, as shown in FIG. 2C, according to the teaching of the present invention. First area 210 is assigned to participant A, and second area 212 is assigned to participant B.

Embedded picture 102 may be embedded with a first embedded payload 302 located at first area 210, and a second embedded payload 304 located at area 212. First payload 302 may be created and embedded by participant A in embedded picture 102. First payload 302 may be updated and changed by participant A. Participant B and other people except participant A cannot retrieve first payload 302 and thus cannot know the content of first payload 302. Accordingly, payload 302 is a secret of participant A.

Similarly, second payload 304 may be created and embedded by participant B in embedded picture 102. Second payload 304 may be updated and changed by participant B. Participant A and other people except participant B cannot retrieve second payload 304 and thus cannot know the content of second payload 304. Accordingly, payload 304 is a secret of participant B.

Figure 3:
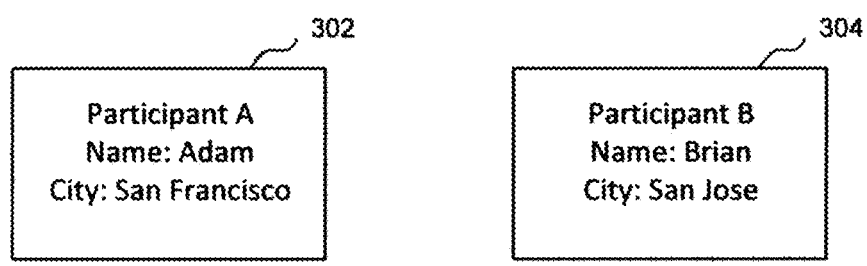
FIG. 3 shows a first payload and a second payload in the embedded picture.

Exemplary first payload 302 and second payload 304 are shown in FIG. 3, according to the teaching of the present invention. For example, first payload 302 may include the name and city of participant A, and second payload 304 may include the name and city of participant B. It is appreciated that various formats of data and images having various contents may be included in payloads 302 and 304.

RSA cryptosystem is one of the first practical public-key cryptosystems and is widely used for secure data transmission. In such a cryptosystem, the encryption key is public, called public key, and differs from the decryption key which is kept secret and thus called private key. A message may be encrypted by a public key, but it cannot be decrypted using the same public key. It must be decrypted using the other key, which is a private key.

A trusted binding between participants A and B may be performed in a micro trusted network, according to the teaching of the present invention. The micro trusted network comprises an embedded picture, which may be any picture or image. For example, the embedded picture may be embedded picture 102 of FIG. 1A, which is an image of flower. Images of documents, including an ID card, a credit card, a currency note, are possible embedded pictures. The embedded picture includes a plurality of areas for embedded payloads assigned to each participant.

Figure 4:
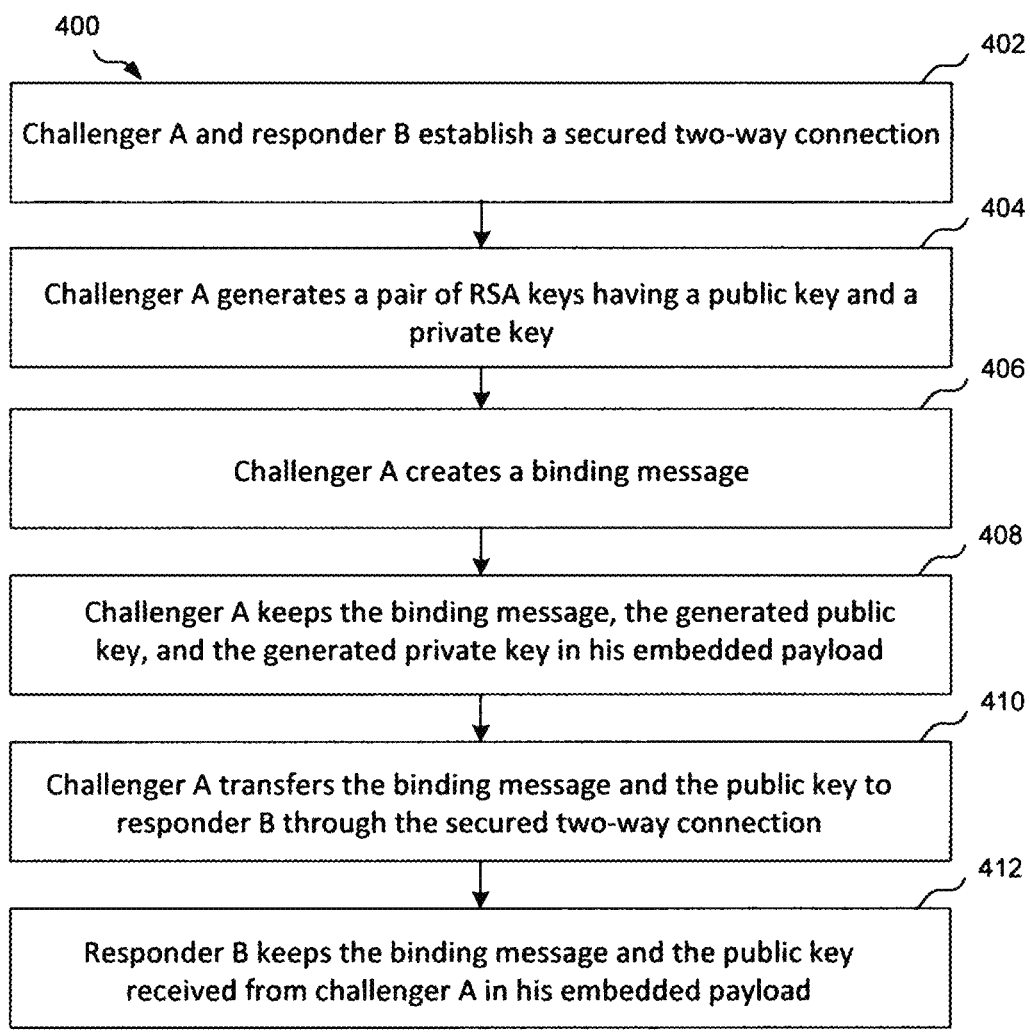
FIG. 4 shows a block diagram of an initiation process of micro trusted network between participants A and B.
Figure 5:
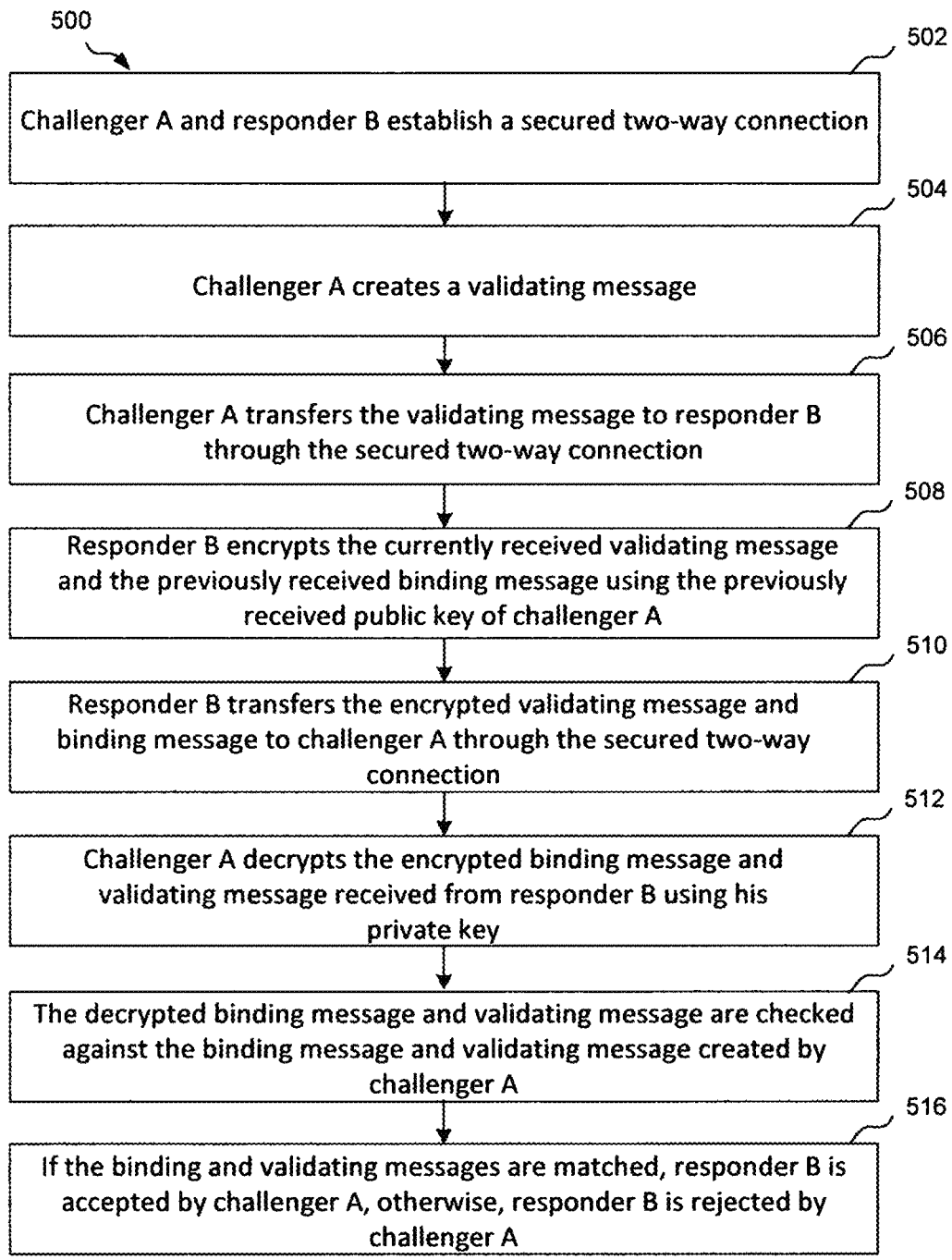
FIG. 5 shows a block diagram of a validation process of micro trusted network between participants A and B.

A process of trusted binding in a micro trusted network between participants A and B is shown in FIGS. 4 and 5, according to the teaching of the present invention. FIG. 4 shows a block diagram 400 of an initiation process of micro trusted network between participants A and B, according to the teaching of the present invention. Participant A is referred as a challenger and participant B is referred as a responder. In step 402, challenger A and responder B establish a secured two-way connection. In step 404, challenger A generates a pair of RSA keys having a public key and a private key. In step 406, challenger A creates a binding message. In step 408, challenger A keeps the binding message, the generated public key, and the generated private key in his embedded payload (e.g., first embedded payload), which is his secret, in a first area of an embedded picture. In step 410, challenger A transfers the binding message and the public key to responder B through the secured two-way connection. In step 412, responder B keeps the binding message and the public key received from challenger A in his embedded payload (e.g., second embedded payload), which is his secret, in a second area of the embedded picture.

FIG. 5 shows a block diagram 500 of a validation process of micro trusted network between participants A and B, according to the teaching of the present invention. In step 502, challenger A and responder B establish a secured two-way connection. In step 504, challenger A creates a validating message, for example, the validating message may be a random query number. In step 506, challenger A transfers the validating message to responder B through the secured two-way connection. In step 508, responder B encrypts the currently received validating message and the previously received binding message from challenger A using the previously received public key of challenger A. In step 510, responder B transfers the encrypted validating message and binding message to challenger A through the secured two-way connection. In step 512, challenger A decrypts the encrypted binding message and validating message received from responder B using his private key. Note in a RSA cryptosystem, the encrypted message can only be decrypted using a private key. In step 514, the decrypted binding message and validating message are checked against the binding message and validating message created by challenger A. In step 516, if the binding and validating messages are matched, responder B is accepted by challenger A, otherwise, responder B is rejected by challenger A.

The trusted binding between challenger A and responder B may be extended to multiple participants, for example, challenger A and responders B, C, D, etc. It is also possible that after participant A acts as a challenger and participant B acts as responder, then participant B acts as a challenger and participant A acts as a responder.

Figure 6:
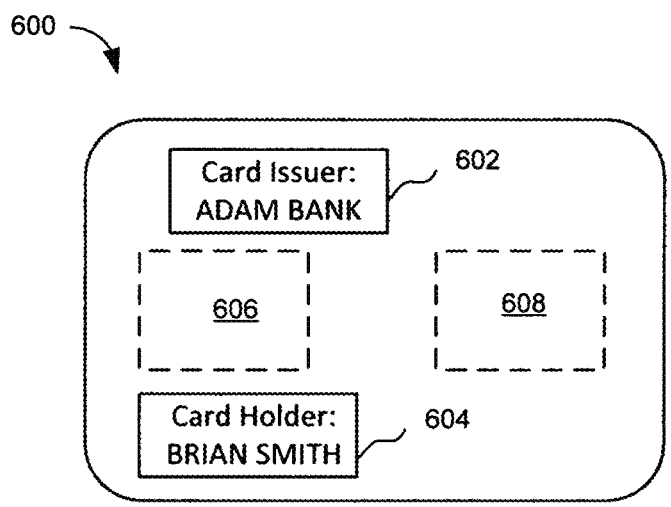
FIG. 6 shows an embedded picture being a digital credit card.

The trusted binding between challenger A and responder B may be applied to the transaction of digital credit card. The micro trusted network has an embedded picture 600 having credit card face data including a card issuer's name 602 and a card holder's name 604 as shown in FIG. 6, according to the teaching of the present invention. Embedded picture 600 has a first area 606 assigned to the card issuer I for his embedded payload and a second area 608 assigned to the card holder H for his embedded payload.

Figure 7:
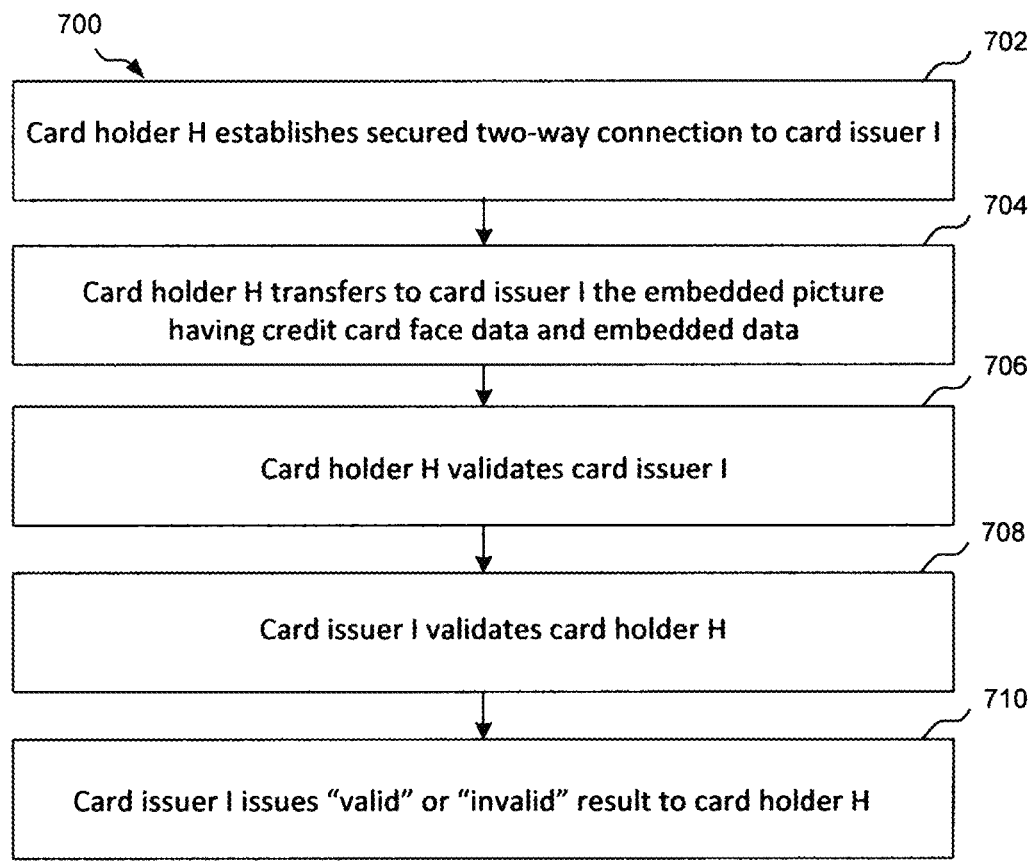
FIG. 7 shows a block diagram of a validation process of digital credit card to a holder by an issuer.

FIG. 7 shows a block diagram 700 of a validation process of digital credit card to a holder by an issuer according to the teaching of the present invention. In step 702, card holder H establishes secured two-way connection to card issuer I. In step 704, card holder H transfers to card issuer I a digital credit card, which comprises embedded picture 600 having the credit card face data and the embedded data. In step 706, card holder H validates card issuer I. In step 708, card issuer I validates card holder H. In step 710, card issuer I issues "valid" or "invalid" result of the digital credit card to card holder H.

Figure 8:
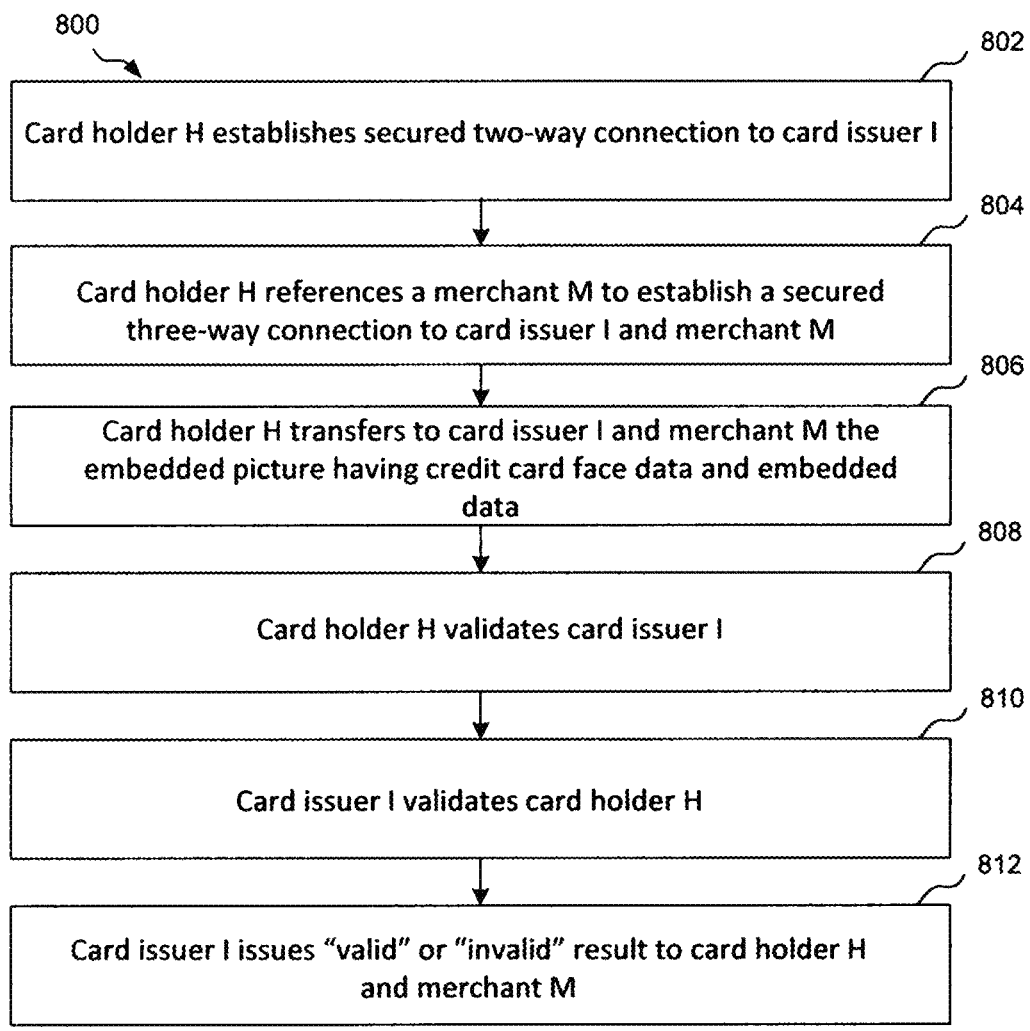
FIG. 8 shows a block diagram of a validation process of digital credit card to a holder and a merchant by an issuer.

FIG. 8 shows a block diagram 800 of a validation process of digital credit card to a holder and a merchant by an issuer according to the teaching of the present invention. In step 802, card holder H establishes secured two-way connection to card issuer I. In step 804, card holder H references a merchant M to establish a secured three-way connection to card issuer I and merchant M. In step 806, card holder H transfers to card issuer I and merchant M a digital credit card, which comprises embedded picture 600 having the credit card face data and the embedded data. In step 808, card holder H validates card issuer I. In step 810, card issuer I validates card holder H. In step 812, card issuer I issues "valid" or "invalid" result of the digital credit card to card holder H and merchant M.

In this manner, the validation of credit card may not require an inquiry to the central data processing unit of the credit card. The validation may be performed based on the trusted binding between the card holder and the card issuer and the credit card face data through a micro trusted network.

Figure 9:
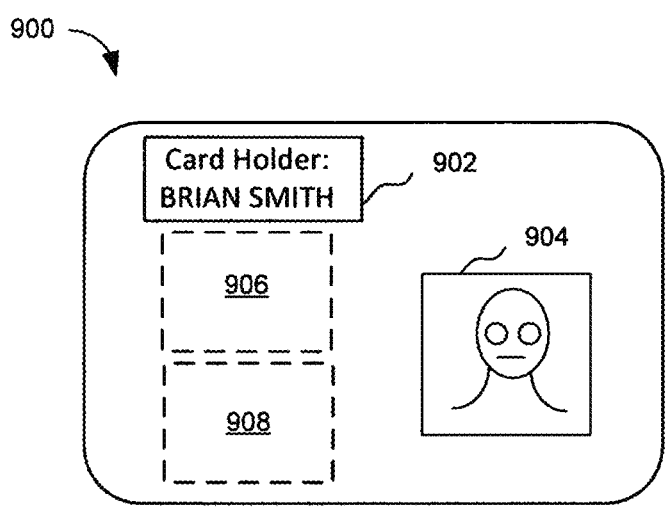
FIG. 9 shows an embedded picture being a digital ID card.

The trusted binding between challenger A and responder B may be applied to the verification of digital ID card. The micro trusted network has an embedded picture 900 having ID card face data including a card holder's name 902 and photograph 904 as shown in FIG. 9, according to the teaching of the present invention. Embedded picture 900 has a first area 906 assigned to the card issuer I for his embedded payload and a second area 908 assigned to the card holder H for his embedded payload.

Figure 10:
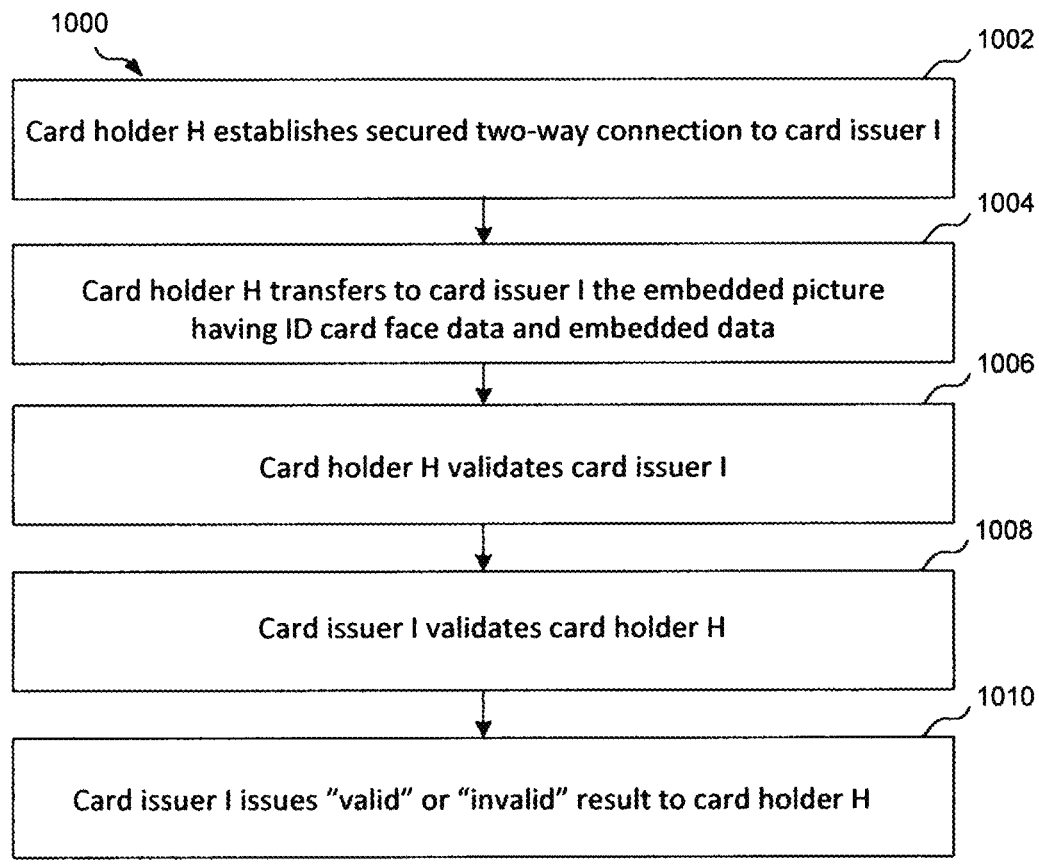
FIG. 10 shows a block diagram of a validation process of digital ID card to a holder by an issuer.

FIG. 10 shows a block diagram 1000 of a validation process of digital ID card to a holder by an issuer according to the teaching of the present invention. In step 1002, card holder H establishes secured two-way connection to card issuer I. In step 1004, card holder H transfers to card issuer I a digital ID card, which comprises embedded picture 900 having ID card face data and the embedded data. In step 1006, card holder H validates card issuer I. In step 1008, card issuer I validates card holder H. In step 1010, card issuer I issues "valid" or "invalid" result of the ID card face data to the card holder H.

Figure 11:
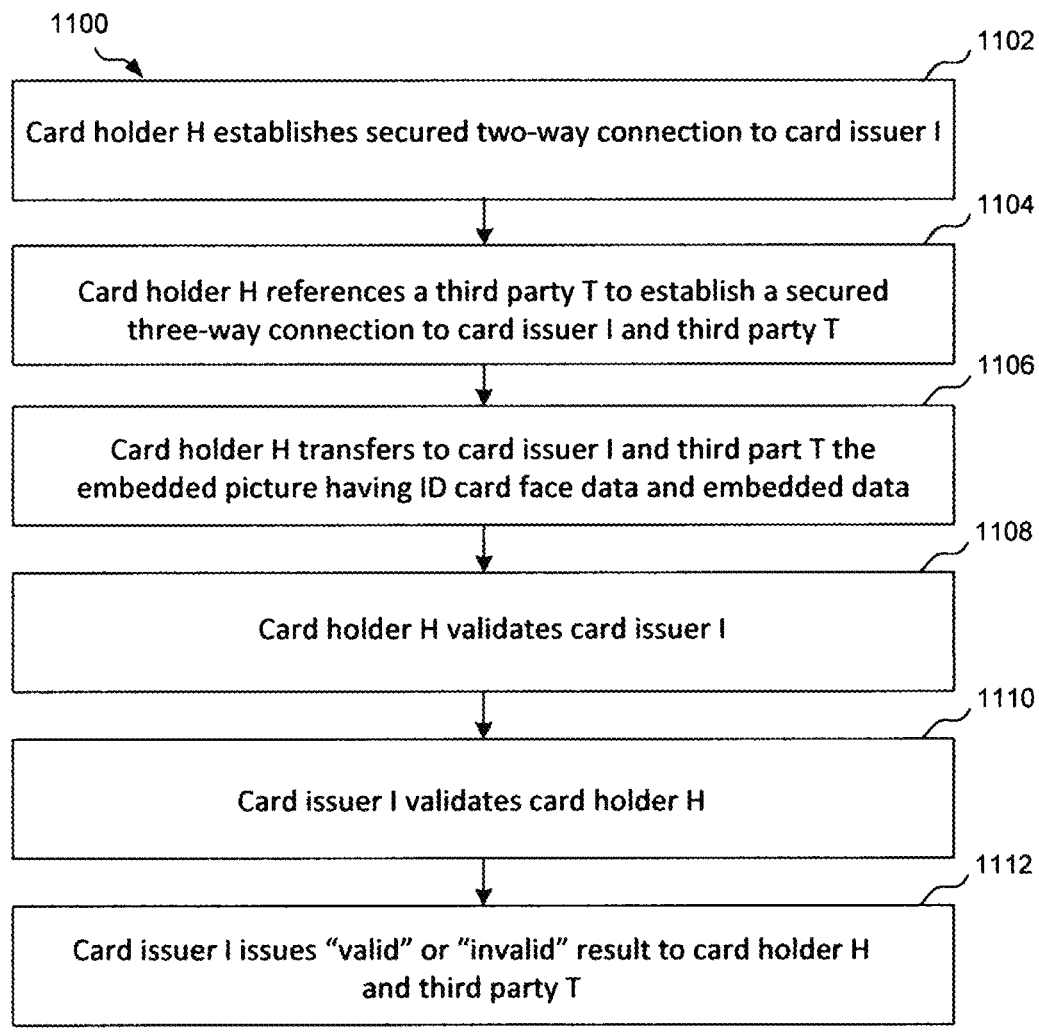
FIG. 11 shows a block diagram of a validation process of digital ID card to a holder and a third party by an issuer.

FIG. 11 shows a block diagram 1100 of a validation process of digital ID card to a holder and a third party by an issuer according to the teaching of the present invention. In step 1102, card holder H establishes secured two-way connection to card issuer I. In step 1104, card holder H references a third party T to establish a secured three-way connection to card issuer I and third party T. In step 1106, card holder H transfers to card issuer I and third party T a digital ID card, which comprises the embedded picture having ID card face data and the embedded data. In step 1108, card holder H validates card issuer I. In step 1110, card issuer I validates card holder H. In step 1112, card issuer I issues "valid" or "invalid" result to card holder H and third party T.

In this manner, the validation of ID card may not require an inquiry to the central data processing unit of the ID card. The validation may be performed based on the trusted binding between the card holder and the card issuer and the ID card face data through a micro trusted network.

Figure 12:
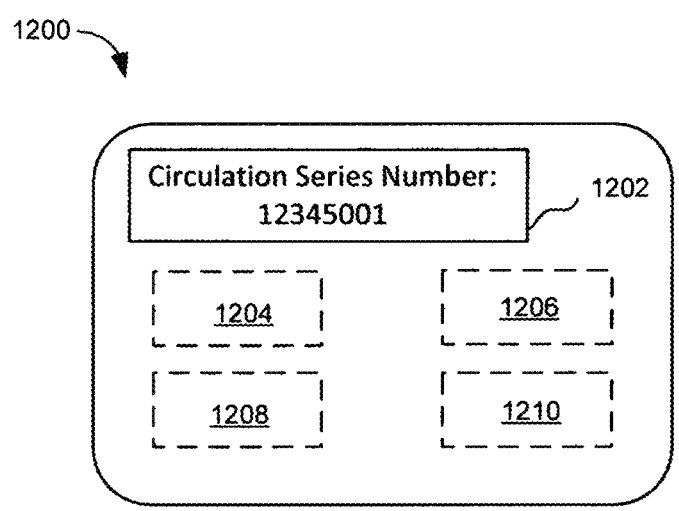
FIG. 12 shows an embedded picture being a digital currency note.

The trusted binding between challenger A and responder B may be applied to the transaction of digital currency note from a current owner to a next owner. The micro trusted network has an embedded picture 1200 of a digital currency note having note face data including a circulation series number 1202. Embedded picture 1200 has a first area 1204 assigned to a trader A for his embedded payload, a second area 1206 assigned to an owner of a current digital currency note for his embedded payload, a third area 1208 assigned to an owner of a new digital currency note for his embedded payload, and a fourth area 1210 assigned to a trader B for his embedded payload. FIG. 12 shows that embedded picture 1200 is a digital currency note. In an embodiment, only trader A is required.

The trader A and trader B are two separate corporations administering the transaction and the transfer of the digital currency note from the owner of the current digital currency note to the owner of the new digital currency note. A digital currency note is a note having monetary value similar to a bank note.

Figure 13:
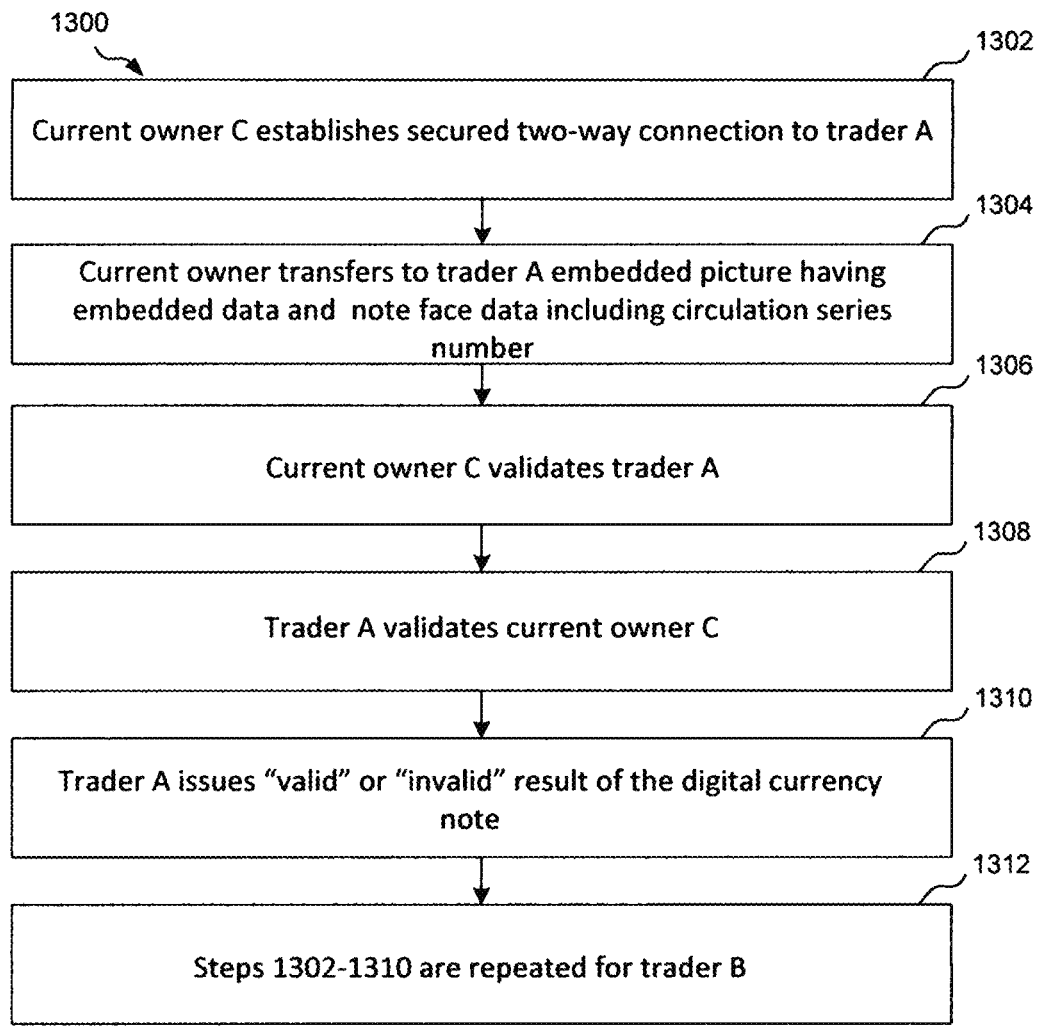
FIG. 13 shows a block diagram of a validation process of digital currency note to an owner of a current digital currency note by two traders.

FIG. 13 shows a block diagram 1300 of a validation process of digital currency note to the owner of the current digital currency note by two traders according to the teaching of the present invention. Only one trader or more than two traders are also possible. In step 1302, owner of current digital currency note C (current owner C) establishes secured two-way connection to trader A. In step 1304, owner of current digital currency note C transfers to trader A a current digital currency note, which comprises embedded picture 1200 having embedded data and note face data including circulation series number 1202. In step 1306, owner of current digital currency note C validates trader A. In step 1308, trader A validates owner of current digital currency note C. In step 1310, trader A issues "valid" or "invalid" result of the digital currency note to owner of current digital currency note C. In step 1312, steps 1302-1310 are repeated for trader B. In an embodiment, step 1312 may be omitted.

Figure 14A:
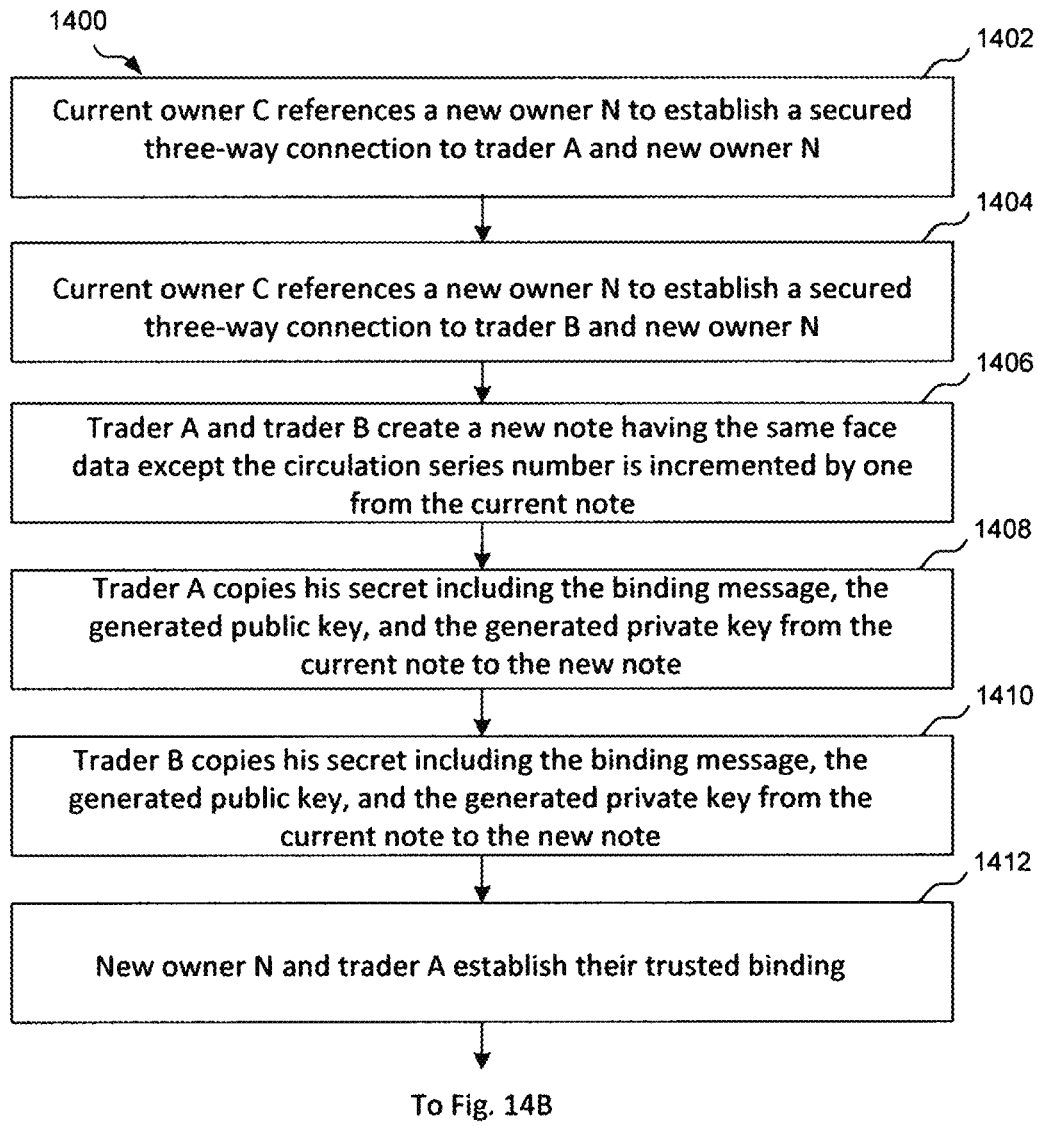
FIG. 14A shows a block diagram of a process of transferring digital currency note from the owner of the current digital currency note to an owner of a new digital currency note.
Figure 14B:
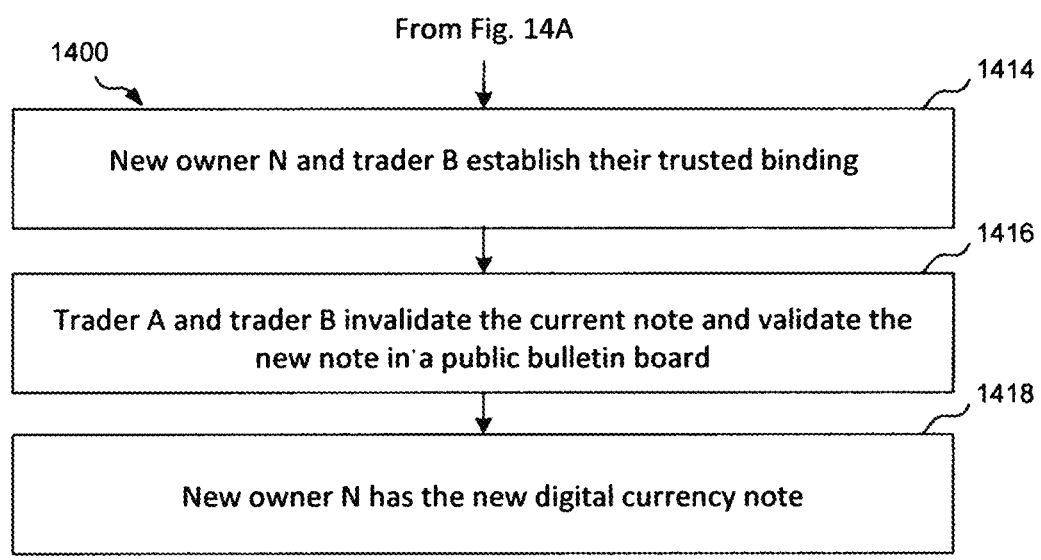
FIG. 14B shows continuation of FIG. 14A.
Figure 15:
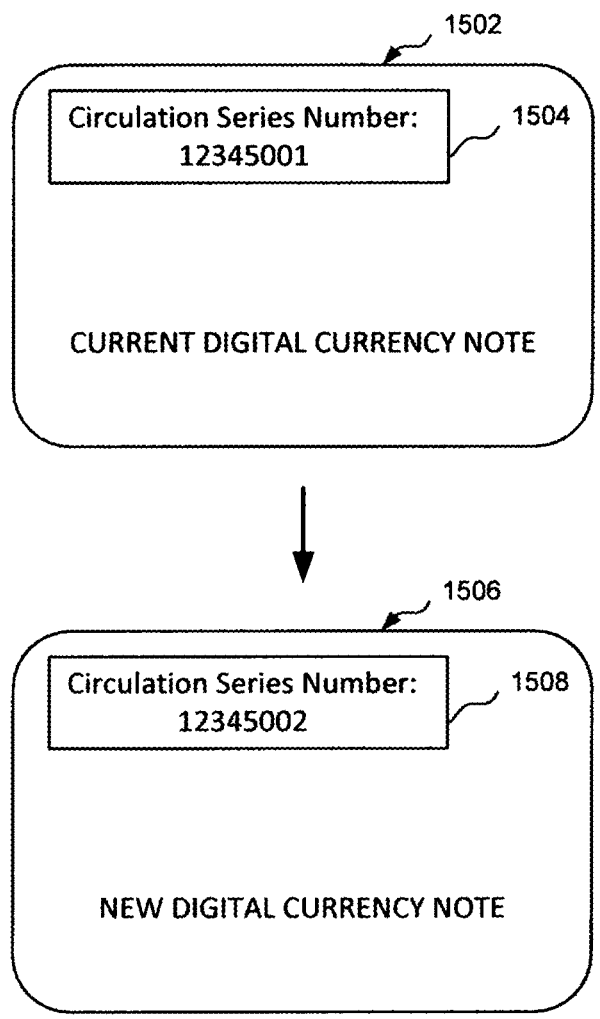
FIG. 15 shows a current digital currency note and a new digital currency note.

FIGS. 14A and 14B shows a block diagram 1400 of a process of transferring digital currency note from the owner of the current digital currency note to the owner of the new digital currency note according to the teaching of the present invention. In step 1402, owner of current digital currency note C references to owner of new digital currency note N (new owner N) to establish a secured three-way connection to trader A and to owner of new digital currency note N. In step 1404, owner of current digital currency note C references to owner of new digital currency note N to establish a secured three-way connection to trader B and to owner of new digital currency note N. In step 1406, trader A and trader B create a new note having the same face data except the circulation series number is incremented by one from the current note, as shown in FIG. 15. In step 1408, trader A copies his secret payload including the binding message, the generated public key, and the generated private key from the current note to the new note. In step 1410, trader B copies his secret payload including the binding message, the generated public key, and the generated private key from the current note to the new note. In step 1412, owner of new digital currency note N and trader A establish their trusted binding. In step 1414, owner of new digital currency note N and trader B establish their trusted binding. In step 1416, trader A and trader B invalidate the current note and validate the new note in a public bulletin board. The public bulletin board may record all active notes. In step 1418, owner of new digital currency note N has the new digital currency note.

FIG. 15 shows a current digital currency note 1502 having a current circulation series number 1504, which is 12345001, and a new digital currency note 1506 having a new circulation series number 1508, which is 12345002, and which is incremented by one from current circulation series number 1504 of current digital currency note 1502.

It is appreciated that the trusted binding between challenger A and responder B may be applied to various schemes, for example, digital trusted documents and remote contracting, discrete commands system, etc.

The methods and processes of micro trusted network described in the disclosure may be performed by a computing device or a plurality or computing devices. The computing devices include computers, mobile phones, and other computing devices. The methods and processes of micro trusted network comprise a process of trusted binding between two participants or among a plurality of participants using an embedded picture having embedded secret payloads in a plurality of areas in the embedded picture.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods and processes, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method for performing trusted binding among a plurality of participants including a first participant and a second participant, comprising:
generating an embedded picture, wherein the embedded picture has a first area assigned to a first participant and a second area assigned to a second participant, wherein the first and second areas are distinct, wherein the embedded picture is a human recognizable picture, wherein generating an embedded picture comprises:
generating, by the first participant, a pair of RSA (Rivest Shamir Adleman) keys and a binding message, wherein the pair of RSA keys comprises a public key and a private key;
establishing a secured two-way connection between the first participant and the second participant;
receiving, by the second participant from the first participant via the secured two-way connection, the public key and the binding message;
embedding, by the first participant in the first area of the embedded picture, the public key, the private key and the binding message;
embedding, by the second participant in the second area of the embedded picture, the public key and the binding message;
subsequent to generating the embedded picture:
sending, by the first participant to the second participant via a secured two-way connection, a validating message;
retrieving, by the second participant from the second area of the embedded picture, the public key and the binding message;
generating, by the second participant, a response message, wherein the response message is generated by combining the validating message with the binding message retrieved from the embedded picture and encrypting the combined messages with the public key;
receiving, by the first participant, the response message;
retrieving, by the first participant from the first area of the embedded picture, the private key and the binding message;
validating, by the first participant, the response message by decrypting the response message with the private key, and comparing the decrypted contents of the response message to the sent validating message and the retrieved first binding message.

2. The method of claim 1, wherein the validating message is a random query number.

3. The method of claim 1, wherein the first participant is a challenger and the second participant is a responder.

4. The method of claim 1, wherein the first participant is a card holder and the second participant is a card issuer, the method further comprising the steps of:
transferring, by the card holder, a digital credit card to the card issuer;
validating, by the card holder, the card issuer;
validating, by the card issuer, the card holder;
issuing, by the card issuer, a validation result of the digital credit card to the card holder.

5. The method of claim 1, wherein the plurality of participants further include a third participant, wherein the first participant is a card holder, the second participant is a card issuer, and the third participant is a merchant, the method further comprising the steps of:
establishing a secured three-way connection among the card holder, the card issuer, and the merchant;
transferring, by the card holder, a digital credit card to the card issuer and the merchant
validating, by the card holder, the card issuer;
validating, by the card issuer, the card holder;
issuing, by the card issuer, a validation result of the digital credit card to the card holder and the merchant.

6. The method of claim 1, wherein the first participant is a card holder and the second participant is a card issuer, the method further comprising the steps of:
transferring, by the card holder to the card issuer, a digital ID (identification) card;
validating, by the card holder, the card issuer;
validating, by the card issuer, the card holder;
issuing, by the card issuer, a validation result of the digital ID card to the card holder.

7. The method of claim 1, wherein the plurality of participants further include a third participant, wherein the first participant is a card holder, the second participant is a card issuer, and the third participant is a third party, the method further comprising the steps of:

establishing a secured three-way connection among the card holder, the card issuer, and the third party;

transferring, by the card holder to the card issuer and the third party, a digital ID card;

validating, by the card holder, the card issuer;

validating, by the card issuer, the card holder;

issuing, by the card issuer, a validation result of the digital ID card to the card holder and the third party.

8. The method of claim 1, wherein the plurality of participants further include a third participant, wherein the first participant is a first trader, the second participant is an owner of a current digital currency note, and the third participant is an owner of a new digital currency note, the method further comprising the steps of:

transferring, by the owner of the current digital currency note to the first trader, the current digital currency note;

validating, by the owner of the current digital currency note, the first trader;

validating, by the first trader, the owner of the current digital currency note;

issuing, by the first trader, a validation result of the current digital currency note to the owner of the current digital currency note.

9. The method of claim 8 further comprising:

establishing a secured three-way connection among the first trader, the owner of the current digital currency note, and the owner of the new digital currency note;

creating, by the first trader, the new digital currency note;

copying, by the first trader, the binding message, the public key, and the private key from the current digital currency note to the new digital currency note;

establishing a trusted binding between the owner of the new digital currency note and the first trader;

invalidating, by the first trader, the current digital currency note and validating, by the first trader, the new digital currency note in a public bulletin board.

10. The method of claim 9, wherein the public bulletin board records all active digital currency notes.

11. The method of claim 9, wherein the current digital currency note has a current circulation series number and the new digital currency note has a new circulation series number, and wherein the new circulation series number is incremented by one from the current circulation series number.

12. The method of claim 8, wherein the plurality of participants further include a fourth participant, wherein the fourth participant is a second trader.

13. The method of claim 1, wherein the steps performed by the first and second participants are performed via a plurality of computing devices.

14. The method of claim 13, wherein the plurality of computing devices comprise a computer.

15. The method of claim 13, wherein the plurality of computing devices comprise a mobile phone.

\* \* \* \* \*